UNITED STATES PATENT OFFICE 2,647,876

COPOLYMERS OF VINYL PHENOLS WITH DRYING OILS

Edward Michael Evans, Tonbridge, and Stanley Erwin Bradshaw, Tunbridge Wells, England, and John Edward Seager Whitney, Penarth, Wales, assignors to British Resin Products Limited, London, England, a British company No Drawing. Application January 10, 1950, Serial No. 137,891. In Great Britain January 15, 1949

11 Claims. (Cl. 260—23)

The present invention relates to the polymerisation of vinyl phenol-type compounds and has as object the production of copolymers thereof with drying oils.

The polymerisation of vinyl phenols is known, and the polymerisation of drying oils is also known, but the polymerisation of mixtures of these two types of monomer has not previously been described.

We have now found that, by subjecting mixtures of vinyl phenol-type compounds and drying oils to polymerisation conditions, copolymers are formed, the molecules of which contain units of each type.

Amongst the polymerisation initiators found to be suitable are organic and inorganic peroxy compounds, such as acetyl, crotonyl, benzoyl, tertiary butyl and isopropyl benzene peroxides, peresters, such as tertiary butyl perbenzoate, hydroperoxides, such as tertiary butyl and isopropyl benzene hydroperoxides, the alkali metal and ammonium per sulphates and perborates, stannic chloride, ultra violet light, heat and activated clays.

By "vinyl phenol-type compound" is meant the ortho, meta and para vinyl phenols and their lower nuclear homologues, such as the methyl, ethyl and propyl substituted derivatives, which may be formed by dehydrogenation and/or cracking of phenol-substituted open chain hydrocarbons. Suitable drying oils include tung oil, dehydrated castor oil, oiticica oil and linseed oil and particularly those oils having a high degree of conjugation of the unsaturated linkages.

Other polymerisable compounds such as styrene, alpha methyl styrene and their lower nuclear homologues, acrylic acid esters and vinyl esters may be incorporated in the monomer mixture, when these also will be included in the molecular structure of the resulting copolymer. As in the case of the polymerisation of vinyl phenol-type compounds alone, it is preferred to exclude oxygen from the reaction mixture.

In the production of varnish bases and sealing resins by subsequent dilution with a volatile solvent, the copolymerisation should be interrupted prior to gelation, such gelation then taking place in situ on subsequent use. The resulting resins then possess an adhesion superior to that of the corresponding styrene-drying oil copolymers by virtue of the phenolic hydroxy groups present, and at the same time gell much more rapidly than the drying oil alone. If desired, the oil may be partially prepolymerised before it is copolymerised with the vinyl phenol-type compound.

The following examples illustrate various embodiments of this invention, the parts referred to being by weight.

Example 1

A mixture of 90 parts of tung oil, 10 parts of meta vinyl phenol and one part of benzoyl peroxide was heated to 140° C. for 5 hours and then cooled and thinned with 40 parts of a mixture of equal parts of butanol and xylene. On addition of 0.1% of cobalt and 0.5% of lead (as naphthenates) the resulting mixture was suitable for use as an air-drying varnish.

Example 2

The mixture described in Example 1 was heated to 140° C. and held at this temperature for 7 hours, when a rubbery gel was formed. The particular sample of tung oil used in this example, however, would not gel at this temperature until heated for at least 13 hours.

Example 3

A mixture of 20 parts of tung oil, 10 parts of meta vinyl phenol, 40 parts of xylene and 0.8 part of activated fuller's earth was refluxed at 140–150° C. while stirring under an atmosphere of carbon dioxide for four hours. The catalyst was then removed by filtration and the solvent by steam distillation to leave a slightly cloudy varnish base having a viscosity of 40 poises. The base was soluble in aromatic hydrocarbons, and possessed air-drying properties on the addition of metallic driers.

Example 4

A mixture of 10 parts of tung oil, 6.6 parts of styrene, 3.3 parts of meta vinyl phenol and 0.1 part of ditertiary butyl peroxide was refluxed as in Example 3 for 4 hours at 140–180° C. and the product was divided into two parts. One part was incorporated with 0.1% of cobalt and 0.5% of lead, as naphthenates, and diluted with xylene to give an air-drying varnish, while the other part was heated at 180° C. for 20 minutes to give a rubbery gel.

Example 5

A mixture of 10 parts of metavinyl phenol and 90 parts of blown linseed oil was heated at 150° C. while stirring under an atmosphere of carbon monoxide for 5 hours to give a clear, orange, viscous product which was soluble in xylene and possessed air-drying properties when incorporated with metallic driers.

Example 6

A mixture of 80 parts of 40-poise dehydrated castor oil, 80 parts of ortho vinyl phenol and 0.8 part of tertiary butyl hydroperoxide was stirred and heated at 150° C. for 5½ hours, and then cooled to give a brown viscous resin. The product was soluble in a mixture of 75 parts of xylene and 25 parts of butanol, and was a suitable base for air-drying varnishes.

The novel resins of this invention may, if desired, be subjected to the cross-linking and/or etherification treatments disclosed in our copending applications, Ser. No. 127,783 filed November 16, 1949, and Ser. No. 127,784 filed November 16, 1949.

We claim:

1. A process as set forth in claim 4, wherein the vinyl compound is metavinyl phenol and the drying oil is tung oil.
2. A process as set forth in claim 4, wherein the vinyl compound is metavinyl phenol and the drying oil is bodied linseed oil.
3. A process as set forth in claim 4, wherein the vinyl compound is orthovinyl phenol and the drying oil is dehydrated castor oil.
4. A process for the production of a synthetic varnish resin which consists of copolymerising a vinyl compound selected from the group consisting of ortho, meta and para-vinyl phenol, their methyl, ethyl and propyl nuclear substituted homologues having at least one reactive hydrogen atom attached directly to the nucleus and a mixture of styrene with such phenol, with a drying oil selected from the group consisting of tung oil, dehydrated castor oil, oiticica oil and linseed oil in the absence of oxygen, and interrupting the copolymerisation prior to gelation and adding a volatile aromatic hydrocarbon solvent for the resin.
5. A varnish prepared in accordance with the process of claim 4 wherein copolymerisation is carried out under the influence of heat and the non-gelled copolymer is cooled before the addition thereto of the volatile aromatic hydrocarbon solvent.
6. A varnish prepared in accordance with the process of claim 4 having free phenolic hydroxy groups present and possessing a superior adhesion.
7. A varnish prepared in accordance with the process of claim 4 in which the resin consists of a non-gelled copolymer of tung oil and meta-vinyl phenol.
8. A varnish prepared in accordance with the process of claim 4 in which the resin consists of a non-gelled copolymer of linseed oil and meta-vinyl phenol.
9. A varnish prepared in accordance with the process of claim 4 in which the resin consists of a non-gelled copolymer of dehydrated castor oil and orthovinyl phenol.
10. A varnish prepared in accordance with the process of claim 4, containing a metallic drier, having free phenolic hydroxy groups present and possessing a superior adhesion.
11. A varnish prepared in accordance with the process of claim 4 in which the resin consists of a non-gelled copolymer of tung oil, meta-vinyl phenol and styrene.

EDWARD MICHAEL EVANS.
STANLEY ERWIN BRADSHAW.
JOHN EDWARD SEAGER WHITNEY.

References Cited in the file of this patent

UNITED STATES PATENTS

| Number | Name | Date |
|---|---|---|
| 2,285,797 | Bellefontaine et al. | June 9, 1942 |
| 2,392,710 | Wakeford et al. | Jan. 8, 1946 |
| 2,459,835 | Monroe | Jan. 25, 1949 |
| 2,470,757 | Bobalek | May 24, 1949 |
| 2,495,458 | Kanning et al. | Jan. 24, 1950 |

OTHER REFERENCES

Young, Official Digest, September, 1949, pp. 610–615.